Aug. 28, 1928.

C. A. KINNEY

COMBINATION TOOL

Filed Nov. 14, 1923

1,682,009

Claude A. Kinney
INVENTOR

BY Victor J. Evans
ATTORNEY

Patented Aug. 28, 1928.

1,682,009

UNITED STATES PATENT OFFICE.

CLAUDE A. KINNEY, OF HANNIBAL, MISSOURI.

COMBINATION TOOL.

Application filed November 14, 1923. Serial No. 674,734.

This invention relates to new and useful improvements in combination tools and more particularly to a tool of this character which is particularly adapted for use in constructing fences. The main object of the present invention is the provision of a tool which includes in its construction means for pulling staples, nails, tacks, and the like, together with means for stretching and cutting strands of wire, and embodies in its construction pivotally connected parts which can be folded to occupy a minimum space when not in use.

Another object of the present invention is the provision of a combination tool including parallel arranged shank portions which are pivotally connected together so that they may be readily positioned at various angles with respect to each other, said shank portions carrying several types of tools which may be quickly and readily brought into an operative position through the adjustment of the pivotally connected shanks.

With the above and other objects in view the invention consists in the novel features in construction, the combination and arrangement of parts hereinafter more fully set forth, pointed out in the claim, and shown in the accompanying drawings in which:—

Figure 1:
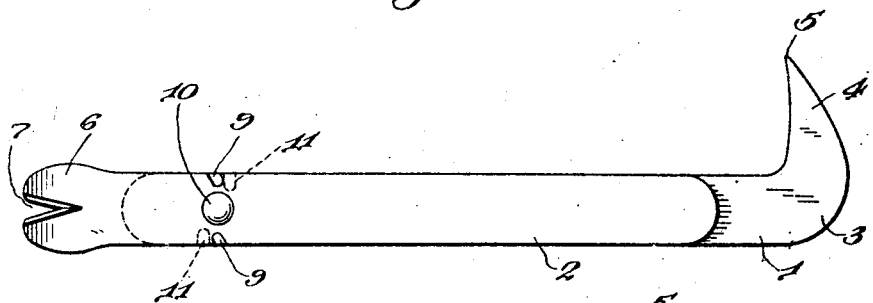
Figure 2:
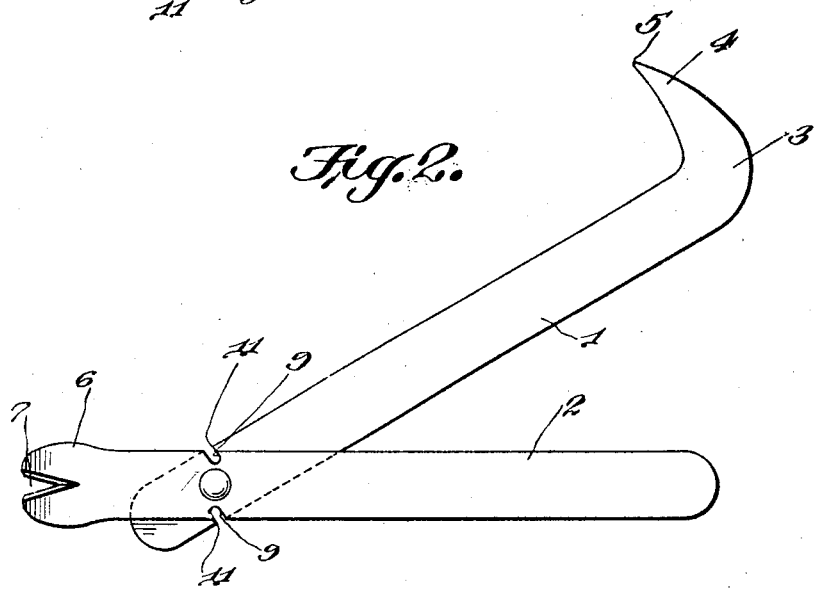
Figure 3:
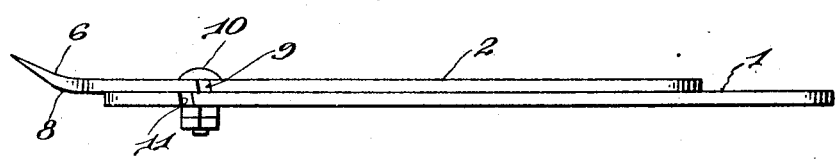

Fig. 1 is a side elevation of my improved tool showing the same in a folded position, Fig. 2 is a similar view with one of the members arranged in an adjusted position at an angle with respect to the other member, and Fig. 3 is an edge elevation of the tool showing the same in a folded position.

Referring now more particularly to the drawings, wherein reference characters are used to designate the several parts, it will be noted that the two main shanks 1 and 2 are disposed in parallel abutting relation when in a folded position as shown in Figs. 1 and 3 so as to occupy a minimum space when not in use.

The shank 1 has formed upon its outer free end a head 3 having a tapering claw 4 which terminates in a point 5 adapted to be inserted beneath the staples and the like for extracting the same, although it will be apparent that this tapered hook portion 4 may be used for various other purposes. The shank 1 is pivotally connected at a point adjacent its inner end to the shank 2, said pivotal connection to the shank 2 being arranged adjacent the tool end of the shank 2 and remote from its other end.

Each of the shanks 1 and 2 constitutes a handle for their respective tool members, the shank 2 having formed upon its outer end a flattened portion 6 which is disposed at an oblique angle with respect to the body of the shank as shown in Fig. 3 and bifurcated to provide a substantially V-shaped notch 7 which extends inwardly from the outer end of the flattened portion for receiving the shanks of nails, tacks, and the like whereby the heads of the nails, tacks, and the like may be engaged with the upper surface of the flattened portion 6 for extracting such elements, the joining portion 8 of the flattened portion 6 and shank 2 forming a fulcrum for use in forcing upwardly upon the nails, tacks, or other objects to be operated upon.

The shank 2 is provided within its longitudinal edges with inwardly extending notches 9, said notches being disposed upon opposite sides of the pivot point 10 and extending inwardly of the shank portion 2 in opposite directions and preferably at an oblique angle as clearly illustrated in Fig. 1. The shank 1 adjacent its pivoted end is provided with notches 11 which extend inwardly from the longitudinal edges of the shank and are disposed upon opposite sides of the pivot point 10 and further disposed in a staggered position so that when the shanks 1 and 2 are moved at an angle with respect to each other as shown in Fig. 2, the transverse recesses 11 of the shank 1 will be brought into alinement with the oblique recesses 9 of the shank 2, so that a strand of wire or the like may be readily inserted in the notches whereby movement of the shank 1 toward the shank 2 will sever the wire at the proper point or that point which is engaged within the notches formed in the shanks 1 and 2. It will be apparent that in order to bring the notches in proper alinement the shank 2 is disposed in a substantially horizontal plane with the shank 1 moved in a position at an oblique angle with respect to the shank 2 as clearly illustrated in Fig. 2.

It will be noted that when the two shank members 1 and 2 are brought together or disposed in a parallel plane, the bodies of the shanks will form a suitable handle whereby the tapering portion 4 may be readily engaged with staples or the like for operating upon the same, and the notched portion 6 may be readily used for engaging beneath the heads of nails, tacks, or the like for extracting the same and this portion may also be used for stretching the strands of wire around a post so that the wire may be drawn and held taut while being fastened to the post. The wire may be attached to the notched end of the shank 2 by giving the strand of wire a half wrap and then extending the same through the V-shaped notch.

It will be apparent from the foregoing that I have provided a simple and durable combination tool which can be used for a great many purposes, can be manufactured and placed upon the market at a comparatively low cost, and at the same time is so arranged that it will occupy minimum space when not in use.

While I have shown and described the preferred form of my invention, I wish it to be understood that various changes and alterations may be carried out during the manufacture of the same without departing from the spirit of the invention or the scope of the appended claim.

Having thus described my invention what I claim is:

In a tool of the class described, two relatively narrow members, means for pivotally connecting said members together whereby one of said members will extend but a relatively short distance beyond said pivoting point, and such that the other member will extend beyond said pivoting point a distance relatively short compared to the other length thereof but of greater extent than said first-named member, said members having slots formed therein adjacent said pivoting point, said slots being adapted to be disposed in alinement when said members are moved from parallel relation with respect to each other.

In testimony whereof I affix my signature.

CLAUDE A. KINNEY.